United States Patent Office 3,392,186
Patented July 9, 1968

3,392,186
SULFUR-CONTAINING POLYOLEFINIC SULFATES
John W. Lynn, Charleston, W. Va., assignor to Union Carbide Corporation, a corporation of New York
No Drawing. Filed Mar. 11, 1964, Ser. No. 351,197
13 Claims. (Cl. 260—457)

ABSTRACT OF THE DISCLOSURE

Sulfur-containing polyolefins of the formula

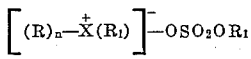

and their corresponding polyepoxide compounds wherein each $R_1$ is a monovalent substituted or unsubstituted hydrocarbon radical; X is either nitrogen, phosphorous or sulfur; n is an integer having the value equal to the valence of X; and R is a monovalent substituted or unsubstituted hydrocarbon radical containing at least one olefinic linkage when the compound is a polyolefin and at least one oxirane oxygen atom when the compound is a polyepoxide. The compounds of this invention are used to impart crease resistance to cotton based fabrics, wet strength improvers for paper and in addition the polyepoxides produce thermoset polymers.

---

This invention relates to sulfur-containing organic compounds. More specifically, this invention relates to sulfur-containing polyolefins and to sulfur-containing polyepoxy compounds derived therefrom.

The sulfur-containing polyolefins of this invention have the formula:

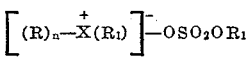

wherein each $R_1$ radical, which can be the same or different, is a monovalent substituted or unsubstituted hydrocarbon radical, generally containing from one to ten carbon atoms inclusive, preferably one to six carbon atoms inclusive; R is a monovalent substituted or unsubstituted hydrocarbon radical having at least one olefinic linkage and generally containing from two to 22 carbon atoms inclusive, preferably from two to 14 carbon atoms inclusive; X is either a nitrogen, phosphorus or a sulfur atom; and n is an integer having a value equal to the valence of X, which is to say, n is 3 when X is nitrogen or phosphorus, and n is 2 when X is sulfur.

Illustrative monovalent substituted or unsubstituted hydrogen radicals for $R_1$ are: the alkyl radicals, as for example, methyl, ethyl, propyl, butyl, nonyl, decyl and the like; cycloaliphatic radicals, as for example, cyclopentyl, cyclohexyl, cycloheptyl, 2-(cyclopentyl)ethyl, 3-(cyclopentyl)propyl, cyclohexylmethyl, 2-(cyclohexyl)ethyl, 3-(cyclohexyl)propyl, cycloheptylmethyl, 2-(cycloheptyl)ethyl, 3-(cycloheptyl)propyl and the like; alkylated cycloaliphatics, as for example, methylcyclopentyl, ethylcyclopentyl, methylcyclohexyl, ethylcyclohexyl and the like; aromatic and aromatic-containing radicals, as for example, phenyl, tolyl, benzyl and the like. The $R_1$ radicals may contain halogen, alkoxy, aryloxy, sulfonyl, cyano, carbalkoxy, carbaryloxy radicals and other substituents which are inert to the reaction conditions encountered in the preparation of the subject compounds.

Illustrative radicals for R are the following monovalent substituted or unsubstituted hydrocarbon radicals having at least one olefinic linkage: ethylenyl, 2-propenyl, 1-propenyl, 2-butenyl, 3-butenyl, 2-pentenyl, 3-pentenyl, 4-pentenyl, 2-octenyl, 7-octenyl, 9-undecenyl, octadecenyl-9; alkylated alkenyl, as for example, 2-methyl-3-butenyl, 3-methyl-2-pentenyl, 2-(cyclohexyl)ethylenyl, 3-(cyclohexyl)-2 - propenyl, 2 - (methylcyclohexyl)ethylenyl, 2-(ethylcyclohexyl)-ethylenyl and the like; unsaturated cycloaliphatic radicals, as for example, 2-cyclopentenyl, 4-methyl-2-cyclopentenyl, 4-isopropyl-2-cyclopentenyl, 3-cyclohexenyl, 2 - ethyl - 3 - cyclohexenyl, 2,6 - dimethyl-3-cyclohexenyl, 2-propenecarboxymethyl, 2-propenecarboxyethyl, 4-cyclohexenecarboxymethyl, bicycloheptenyl, 3a,4,5,6,7,7a-hexahydro-4,7 - methanoinden-5 - yl and the like; polyolefinic monovalent hydrocarbon radicals, as for example, 1,3-butadienyl, 2,4-pentadienyl, 2-methyl-1,3-butadienyl, 2-methyl-2,4-pentadienyl and the like.

The sulfur-containing polyepoxides which are prepared from the sulfur-containing polyolefinic compounds have the formula:

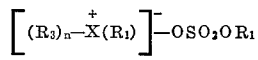

wherein X, n and $R_1$ are as previously defined and $R_3$ is a monovalent hydrocarbon radical having at least one oxirane oxygen atom and generally containing from two to 22 carbon atoms inclusive, preferably from two to 14 carbon atoms inclusive.

Illustrative radicals for $R_3$ are 1,2-epoxyethyl,
2,3-epoxypropyl,
1,2-epoxypropyl,
2,3-epoxybutyl,
3,4-epoxybutyl,
2,3-epoxypentyl,
3,4-epoxypentyl,
4,5-epoxypentyl,
2,3-epoxyoctyl,
7,8-epoxyoctyl,
9,10-epoxyundecyl,
9,10-epoxyoctadecyl,
2-methyl-3,4-epoxybutyl,
3-methyl-2,3-epoxypentyl,
2-cyclohexyl-1,2-epoxyethyl,
3-cyclohexyl-2,3-epoxypropyl,
2-(methylcyclohexyl)-1,2-epoxyethyl,
2-(ethylcyclohexyl)-1,2-epoxyethyl,
2,3-epoxycyclopentyl,
4-methyl-2,3-epoxycyclopentyl,
4-isopropyl-2,3-epoxycyclopentyl,
3,4-epoxycyclohexyl,
2-ethyl-3,4-epoxycyclohexyl,
2,6-dimethyl-3,4-epoxycyclohexyl,
2,3-epoxypropanecarboxymethyl,
2,3-epoxypropanecarboxyethyl,
3,4-epoxycyclohexanecarboxymethyl,
3-oxatricyclo(3.2.1.0$^{2,4}$)oct-6-yl,
7-n-hexyl-3-oxatricyclo(3.2.1.0$^{2,4}$)oct-6-yl,
7-methyl-3-oxatricyclo(3.2.1.0$^{2,4}$)oct-6-yl,
3-oxatricyclo(3.2.1.0$^{2,4}$)oct-6-ylmethyl,
4-[3-oxatricyclo(3.2.1.0$^{2,4}$)oct-6-yl]-butyl,
3a,4,5,6,7a-hexahydro-4,7-methano-5,6-epoxyindanyl and the like.

The sulfur-containing polyolefins of this invention can be conveniently prepared by reacting a compound having the formula:

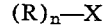

wherein R, X and n are as previously defined, with an organic sulfate having the formula:

wherein $R_1$ is as previously defined.

The preparation of the sulfur-containing polyolefins is conducted by simply admixing the reactants. Generally, it is preferred to employ about 0.5 to about 2 moles of the organic sulfate per mole of the reactant which has the formula:

(R)ₙ—X

More than about 2 moles of the organic sulfate can be used, but this is economically undesirable. For optimum results, it is preferred to employ about equimolar amounts of the reactants.

The reaction temperature can be varied over a wide range depending, in part, on the rate of reaction desired as well as the specific materials which are being reacted. As a rule, the temperature at which the reaction can be conducted can vary from about 0° C. to a temperature below the decomposition temperature of the reactants and of the product formed. A temperature in the range of from about 0° C. to about 70° C. is most preferred.

It is also preferred to conduct the reaction in the presence of an organic diluent which serves to provide a medium for the reaction. The organic diluents employed to disperse the reactants in the preparation of the sulfur-containing polyolefinic compounds are those organic compounds which do not lend themselves to the reaction and which are normally liquid at atmospheric pressure and at temperatures in the range at which the reaction is to be conducted. Illustrative of such organic diluents are the lower aliphatic esters, as for example, ethyl acetate, isopropyl acetate, methyl acetate and the like; lower aliphatic ketones, as for example, methyl ethyl ketone, methyl propyl ketone, diethyl ketone and the like; acetonitrile; and aliphatic ethers, as for example, diethyl ether, diisopropyl ether, dibutyl ether, dihexyl ether and the like.

While the reaction proceeds rapidly at atmospheric pressure, the reaction may also be conducted at sub or super atmospheric pressures.

As a preferred method, the reaction is conveniently carried out by adding the organic sulfate periodically to a stirred mixture of the olefinic reactant and the organic diluent, over a period of from about one to about 24 hours, followed by stirring at ambient temperature for an additional one to two hours, the reaction being essentially completed within this time period. The sulfur-containing polyolefin product is recovered in a pure state as a residue on removing the diluent by a suitable means, as for example, evaporation on a Rinco evaporator, open air evaporation, or by fractional distillation.

The sulfur-containing polyepoxy compounds derived from the sulfur-containing polyolefinic compounds of this invention are prepared by reacting the corresponding sulfur-containing polyolefinic compound with a peroxide in the presence of an inert, normally liquid organic diluent at a temperature on the order of from 0° C. to about 100° C., preferably from about 10° C. to about 80° C., for a period of time sufficient to introduce an oxirane oxygen atom at the site of every ethylenic carbon to carbon unsaturation contained in the sulfur-containing polyolefinic compound. Conveniently, the peroxide can be added dropwise or batchwise to a suitable reaction vessel equipped with a means to agitate the contents of said vessel, and containing the polyolefinic reactant and diluent. This method of addition results in a more easily controlled reaction than a reaction in which the sulfur-containing polyolefin reactant is added to the peroxide.

The peroxide employed as the epoxidation agent can be any peroxide commonly employed as epoxidation agents. Illustrative of suitable peroxides are the peracids, as for example, peracetic, perbenzoic, and perpropionic acids. Hydrogen peroxide is also a suitable epoxidation agent. Theoretically, to effect complete epoxidation of the sulfur-containing polyolefinic compound, at least an equimolar quantity of peroxide based on the equivalents of ethylenic carbon to carbon unsaturation present must be employed.

Diluents are commonly employed in epoxidation reactions. Suitable diluents for this purpose are normally inert organic liquids such as the lower alkyl esters, as for example, ethyl acetate, methyl acetate, butyl acetate and the like. The same or different diluents can be employed in the preparation of the sulfur-containing polyolefinic compounds and the corresponding sulfur-containing polyepoxy compounds.

The epoxidation of the sulfur-containing polyolefinic compounds is conveniently conducted at temperatures in the range of from −10° C. to 90° C., preferably from about 0° C. to about 50° C., for a period of time sufficient to introduce an oxirane oxygen atom at the site of each of the ethylenic carbon to carbon unsaturations of the sulfur-containing polyolefinic compound.

While the reaction can be conducted at pressures of less than or exceeding atmospheric pressure, the reaction progresses smoothly at atmospheric pressure and is preferably conducted at such pressure.

The amount of peroxide consumed during the epoxidation can be readily determined and the extent of reaction gauged during the course of the reaction, by quantitative analytical procedures known to the art. The time required to complete epoxidation ranges, in most instances, from about several minutes to several hours.

Recovery of the sulfur-containing polyepoxides is effected by fractionally distilling the reaction mixture to remove diluent, unreacted peroxide and acid by-product, thereby isolating the sulfur-containing polyepoxide as a residue. Additional purification may be effected, if desired, by subjecting the product to low pressure evaporation in a suitable apparatus, as for example, a Rinco evaporator.

The novel sulfur-containing polyolefins and polyepoxides of this invention find utility in the textile and paper making fields, providing increased crease resistance in cotton based fabrics and improved wet strength in paper when incorporated as additives into such fabrics and papers by methods and in amounts known to the art.

The following examples, which are not to be construed as limitive, illustrate the preparation of the novel sulfur-containing compounds of this invention. Other sulfur-containing compounds falling within the purview of this invention may be prepared in an analogous manner.

Example I.—Bis-[β-(3-cyclohexenecarboxy)-ethyl]-methylsulfonium methyl sulfate

A mixture of 660 grams (5 moles) of bis-(2-hydroxyethyl)thioether, 1890 grams (15 moles) of 3-cyclohexenecarboxylic acid and 2.4 grams of para-toluene sulfonic acid is refluxed for seven hours in 1000 grams of toluene, while removing the water of esterification azeotropically. Following the reaction period, the reaction mixture is neutralized by extractions with a five percent aqueous sodium carbonate solution, followed by washing with 1000 milliliters of water. The toluene is removed by distillation under reduced pressure, yielding 1559 grams of an oily residue. This crude product yields 602 grams of pure bis-[β-(3-cyclohexenecarboxy)ethyl]thioether on being further purified by fractional distillation. A mixture of 338 grams (1 mole) of the above product and 400 milliliters of dry ethyl acetate is stirred at 25–30° C. while adding 126 grams (1 mole) of dimethyl sulfate. After 24 hours at ambient temperature the ester diluent is removed by evaporation at 27° C. and 3 millimeters of mercury pressure, yielding a pale, viscous product of bis - [β - 3(cyclohexenecarboxy)ethyl]methylsulfonium methyl sulfate.

*Analysis.*—Calcd. for $C_{20}H_{32}O_8S_2$: C, 51.70; H, 6.90; S, 13.79. Found: C, 50.58; H, 6.96, S, 13.42.

The infrared spectrum is consistent with the assigned structure.

The proof of structure of the products of each of the following examples is determined by like analysis. The structure of the products may be further confirmed by employing other methods of analysis, known to the art.

Example II.—Bis-(2-propenyl)-methylsulfonium methyl sulfate

A mixture of 115 grams (1 mole) of bis-(2-propenyl)-thioether and 400 milliliters of dry ethyl acetate is stirred at 25–30° C. while adding periodically 126 grams (1 mole) of dimethyl sulfate. After 24 hours at ambient temperature the ester diluent is removed by evaporation at 30° C. and 6 millimeters of mercury, yielding an oily product of bis-(2-propenyl)-methylsulfonium methyl sulfate.

Example III.—Bis-(3-bicycloheptenyl)methylsulfonium methyl sulfate

A mixture of 218 grams (1 mole) of di-(3-bicycloheptenyl)thioether and 500 milliliters of dry ethyl acetate is stirred at 25–30° C. while adding periodically 126 grams (1 mole) of dimethyl sulfate. After 24 hours at ambient temperature the ester diluent is removed by evaporation at 38° C. and 6 millimeters of mercury pressure, yielding a viscous product of bis-(3-bicycloheptenyl)methylsulfonium methyl sulfate.

Example IV.—Tris-[β-(3-cyclohexenecarboxy)-ethyl]-methylammonium methyl sulfate A mixture of 298 grams (2 moles) of tri-(2-hydroxyethyl(amine, 1008 grams (8 moles) of 3-cyclohexenecarboxylic acid and 2.4 grams of para-toluene sulfonic acid is refluxed for seven hours in 1000 grams of toluene, while removing the water of esterification azeotropically. Following the reaction period, the reaction mixture is neutralized by extractions with a five percent aqueous sodium carbonate solution, followed by washing with 1000 milliliters of water. The toluene is removed by distillation under reduced pressure, yielding tri-[β-(3-cyclohexenecarboxy)ethyl]amine. A mixture of 236 grams (0.5 mole) of the above product and 400 milliliters of dry ethyl acetate is stirred at 25–30° C. while adding 63 grams (0.5 mole) of dimethyl sulafte. After 24 hours at ambient temperature the ester diluent is removed by evaporation under reduced pressure, yielding as a residue, tris-[β-(3-cyclohexenecarboxy)ethyl]methylammonium methyl sulfate.

Example V.—Tris-[β-(3-cyclohexenecarboxy)-ethyl] methylphosphonium methyl sulfate A mixture of 332 grams (2 moles) of tri-(2-hydroxyethyl)-phosphine, 1008 grams (8 moles) of 3-cyclohexenecarboxylic acid and 2.4 grams of para-toluene sulfonic acid is reacted in accordance with the procedure of Example IV, the reaction mixture on distillation yielding as a product, tri-[β-(3-cyclohexenecarboxy)ethyl] phosphine. A mixture of 245 grams (0.5 mole) of the above product and 400 milliliters of dry ethyl acetate is stirred at 25–30° C. while adding 63 grams (0.5 mole) of dimethyl sulfate. After 24 hours at ambient temperature the ester diluent is removed by evaporation under reduced pressure, yielding as a residue product, tris-[β-(3-cyclohexenecarboxy)ethyl]methylphosphonium methyl sulfate.

Example VI.—Tris-(2-propenyl)methylammonium methyl sulfate

A mixture of 137 grams (1 mole) of tri-(2-propenyl) amine and 400 milliliters of dry ethyl acetate is stirred at 25–30° C. while adding periodically 126 grams (1 mole) of dimethyl sulfate. After 24 hours at ambient temperature the ester diluent is removed by evaporation under reduced pressure, yielding a product of tris-(2-propenyl) methylammonium methyl sulfate.

Example VII.—Tris-(2-propenyl)methylphosphonium methyl sulfate

A mixture of 154 grams (1 mole) of tri-(2-propenyl) phosphine and 400 milliliters of dry ethyl acetate is stirred at 25–30° C. while adding periodically 126 grams (1 mole) of dimethyl sulfate. After 24 hours at ambient temperature the ester diluent is removed by evaporation under reduced pressure, yielding as a residue product, tris-(2-propenyl)methylphosphonium methyl sulfate.

Example VIII.—Tris-(3-bicycloheptenyl)methylammonium methyl sulfate

A mixture of 293 grams (1 mole) of tri-(3-bicycloheptenyl)amine and 500 milliliters of dry ethyl acetate is stirred at 25–30° C. while adding periodically 126 grams (1 mole) of dimethyl sulfate. After 24 hours at ambient temperature the ester diluent is removed by evaporation under reduced pressure, yielding as a residue product, tris - (3 - bicycloheptenyl)methylammonium methyl sulfate.

Example IX.—Tris-(3-bicycloheptenyl)methylphosphonium methyl sulfate

A mixture of 310 grams (1 mole) of tri-(3-bicycloheptenyl)phosphine and 500 milliliters of dry ethyl acetate is stirred at 25–30° C. while adding periodically 126 grams (1 mole) of dimethyl sulfate. After 24 hours at ambient temperature the ester diluent is removed by evaporation under reduced pressure, yielding as a residue product, tris - (3 - bicycloheptenyl)methylphosphonium methyl sulfate.

Example X.—Bis-[β-(3,4-epoxycyclohexanecarboxy)ethyl]methylsulfonium methyl sulfate Four-hundred-eighteen grams (0.9 mole) of the product of Example I and 500 milliliters of ethyl acetate is stirred in a two liter reaction vessel at 22–48° C. during the dropwise addition over a two hour period of 678 grams of 23.5 percent peracetic acid (2.1 moles of peracetic acid contained) in ethyl acetate. The cooled reaction mixture is fed dropwise into refluxing ethylbenzene at reduced pressure to remove acetic acid, excess peracetic acid and ester diluent. Four hundred fifty grams of pale yellow viscous product is obtained as a residue upon evaporating the ethylbenzene at 5 millimeters of mercury pressure.

*Analysis.*—Calcd. for $C_{20}H_{32}O_{10}S_2$: C, 49.16; H, 6.50; S, 11.41. Found: C, 49.16; H, 655; S, 11.34.

The infrared spectrum is consistent with the assigned structure.

Example XI.—Bis-(2,3-epoxypropyl)methylsulfonium methyl sulfate

One-hundred-eighty grams (0.75 mole) of the product of Example II and 500 milliliters of ethyl acetate is stirred in a two liter reaction vessel at 20–45° C. during the dropwise addition over a two hour period of 566 grams of 23.5 percent peracetic acid (1.75 moles contained) in ethyl acetate. The reaction mixture is maintained at 20–45° C. by means of a wet ice bath during addition of the peracetic acid solution, then maintained at 8° C. for 16 hours. The cooled reaction mixture is fed dropwise into refluxing ethylbenzene to remove acetic acid, unreacted peracetic acid and ester diluent. A pale yellow product of bis-(2,3-epoxypropyl)methylsulfonium methyl sulfate is obtained upon evaporating the ethylbenzene at reduced pressure.

Example XII.—Bis-(3,4-epoxybicycloheptyl)methylsulfonium methyl sulfate

One-hundred-seventy-two grams (0.5 mole) of the product of Example III and 500 milliliters of ethyl acetate is stirred in a two liter reaction vessel at 22–48° C. during the dropwise addition over a two hour period of 388 grams of 23.5 percent peracetic acid (1.2 moles contained) in ethyl acetate. Following the addition of the peracetic acid, the reaction mixture is maintained at about 10° C. for 16 hours. The ester diluent, acetic acid and unreacted peracetic acid is removed in accordance with the procedure of Examples X and XI. Bis-(3,4-epoxybicycloheptyl)methylsulfonium methyl sulfate is obtained upon evaporating the ethylbenzene at reduced pressure.

Example XIII.—Tris-[β-(3,4-epoxycyclohexane-carboxy)ethyl]methylammonium methyl sulfate Two-hundred-ninety-eight grams (0.5 mole) of the product of Example IV and 500 milliliters of ethyl acetate is stirred in a two liter reaction vessel at 22–48° C. during the dropwise addition over a one hour period of 567 grams of 23.5 percent peracetic acid (1.75 moles of peracetic acid contained) in ethyl acetate. The cooled reaction mixture is fed dropwise into refluxing ethylbenzene at reduced pressure to remove acetic acid, excess peracetic acid, and ester diluent. Tris-[β-(3,4-epoxycyclohexanecarboxy)ethyl]methylammonium methyl sulfate is obtained as a product upon evaporating the ethylbenzene under reduced pressure.

Example XIV.—Tris-[β-(3,4-epoxycyclohexanecarboxy)ethyl]methylphosphonium methyl sulfate One-hundred-eighty-eight grams (0.3 mole) of the product of Example V and 500 milliliters of ethyl acetate is stirred in a two liter reaction vessel at 22–48° C. during the dropwise addition over a one hour period of 357 grams of 23.5 percent peracetic acid (1.1 moles of peracetic acid contained) in ethyl acetate. The cooled reaction mixture is then treated according to the recovery process of Example XIII, yielding as a residue product, tris-[β-(3,4 - epoxycyclohexanecarboxy)ethyl]methylphosphonium methyl sulfate.

Example XV.—Tris-(2,3-epoxypropyl)methylammonium methyl sulfate

One-hundred-five grams (0.4 mole) of the product of Example VI and 500 milliliters of ethyl acetate is stirred in a two liter reaction vessel at 22–48° C. during the dropwise addition over a one hour period of 451 grams of 23.5 percent peracetic acid (1.4 moles of peracetic acid contained) in ethyl acetate. The cooled reaction mixture is then treated according to the product recovery process of Example XIII, yielding as a residue product tris-(2,3-epoxypropyl)methylammonium methyl sulfate.

Example XVI.—Tris-(2,3-epoxypropyl)methylphosphonium methyl sulfate

Eighty-four grams (0.3 mole) of the product of Example VII and 500 milliliters of ethyl acetate is stirred in a two liter reaction vessel at 22–48° C. during the dropwise addition over a one hour period of 357 grams of 23.5 percent peracetic acid (1.1 moles of peracetic acid contained) in ethyl acetate. The cooled reaction mixture is then treated according to the product recovery process of Example XIII, yielding as a residue product, tris - (2,3 - epoxypropyl)methylphosphonium methyl sulfate.

Example XVII.—Tris-(3,4-epoxybicycloheptyl)-methylammonium methyl sulfate

Two-hundred-ten grams (0.5 mole) of the product of Example VIII and 500 milliliters of ethyl acetate is stirred in a two liter reaction vessel at 22–48° C. during the dropwise addition over a one hour period of 567 grams of 23.5 percent peracetic acid (1.75 moles of peracetic acid contained) in ethyl acetate. The cooled reaction mixture is then treated according to the product recovery process of Example XIII, yielding as a residue product, tris-(3,4-epoxybicycloheptyl)methylammonium methyl sulfate.

Example XVIII.—Tris-(3,4-epoxybicycloheptyl)methylphosphonium methyl sulfate

Two-hundred-eighteen grams (0.5 mole) of the product of Example IX and 500 milliliters of ethyl acetate is stirred in a two liter reaction vessel at 22–48° C. during the dropwise addition over a one hour period of 567 grams of 23.5 percent peracetic acid (1.75 moles of peracetic acid contained) in ethyl acetate. The cooled reaction mixture is then treated according to the product recovery process of Example XIII, yielding as a residue product, tris-(3,4-epoxybicycloheptyl)methylphosphonium methyl sulfate.

The sulfur-containing polyepoxides of this invention also find utility in the plastics industry, as they can be admixed with stoichiometric amounts of amines to form compositions which can be thermoset to infusible products. This characteristic makes the compounds useful as molding compositions in the preparation of shaped structures.

Many variations and modifications of this invention can be made or carried out in light of the above disclosure without departing from the spirit and scope thereof.

What is claimed is:

1. An organic sulfur-containing polyolefinic compound having the formula:

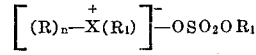

wherein each $R_1$ is a monovalent hydrocarbon radical; X is a member of the group consisting of nitrogen, phosphorus and sulfur; $n$ is an integer having a value equal to the valence of X; and R is selected from the group consisting of monovalent hydrocarbon and monovalent substituted hydrocarbon radicals having at least one olefinic unsaturation therein and wherein the substituent thereof is a member of the group consisting of carboxy and carboxyalkyl.

2. An organic sulfur-containing polyolefinic compound having the formula:

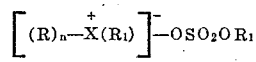

wherein each $R_1$ is a monovalent hydrocarbon radical; X is a nitrogen; $n$ is an integer having a value of 3; and R is selected from the group consisting of monovalent hydrocarbon and monovalent substituted hydrocarbon radicals having at least one olefinic unsaturation therein and wherein the substituent thereof is a member of the group consisting of carboxy and carboxyalkyl.

3. An organic sulfur-containing polyolefinic compound having the formula:

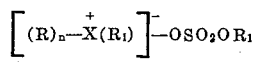

wherein each $R_1$ is a monovalent hydrocarbon radical; X is phosphorus; $n$ is an integer having a value of 3; and R is selected from the group consisting of monovalent hydrocarbon and monovalent substituted hydrocarbon radicals having at least one olefinic unsaturation therein and wherein the substituent thereof is a member of the group consisting of carboxy and carboxyalkyl.

4. An organic sulfur-containing polyolefinic compound having the formula:

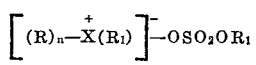

wherein each $R_1$ is a monovalent hydrocarbon radical; X is sulfur; $n$ is an integer having the value of 2; and R is selected from the group consisting of monovalent hydrocarbon and monovalent substituted hydrocarbon radicals having at least one olefinic unsaturation therein and wherein the substituent thereof is a member of the group consisting of carboxy and carboxyalkyl.

5. Bis-[β - (3 - cyclohexenecarboxy)ethyl]methylsulfonium methyl sulfate.

6. Bis-(2-propenyl)methylsulfonium methyl sulfate.

7. Bis - (3 - bicycloheptenyl)methylsulfonium methyl sulfate.

8. Tris - [β - (3 - cyclohexenecarboxy)ethyl]methylammonium methyl sulfate.

9. Tris-(2-propenyl)methylammonium methyl sulfate.

10. Tris-(3-bicycloheptenyl)methylammonium methyl sulfate.

11. Tris - [β - (3 - cyclohexenecarboxy)ethyl]methylphosphonium methyl sulfate.

12. Tris-(2-propenyl)methylphosphonium methyl sulfate.

13. Tris - (3 - bicycloheptenyl)methylphosphonium methyl sulfate.

References Cited

UNITED STATES PATENTS 2,204,976  6/1940  Van Peski et al. _____ 260—457
2,702,774  2/1955  Stayner _____ 260—457

CHARLES B. PARKER, *Primary Examiner.*

L. C. MARUZO, B. BILLIAN, *Assistant Examiners.*